United States Patent
Wellbrock et al.

(10) Patent No.: US 9,568,698 B2
(45) Date of Patent: Feb. 14, 2017

(54) HIGH DENSITY OPTICAL PATCH PANEL RACK

(71) Applicant: Verizon Patent and Licensing Inc., Arlington, VA (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/745,715

(22) Filed: Jun. 22, 2015

(65) Prior Publication Data
US 2016/0370548 A1   Dec. 22, 2016

(51) Int. Cl.
*A61B 5/04*    (2006.01)
*G02B 6/44*    (2006.01)
*G02B 6/38*    (2006.01)

(52) U.S. Cl.
CPC ........... *G02B 6/4452* (2013.01); *G02B 6/3897* (2013.01)

(58) Field of Classification Search
CPC .......... H04Q 1/13; H04Q 1/131; H04Q 1/133; H04Q 1/136; H04Q 1/15; H04Q 1/155
See application file for complete search history.

(56) References Cited

U.S. PATENT DOCUMENTS

| | | | |
|---|---|---|---|
| 2013/0196538 A1* | 8/2013 | Takeuchi | H01R 13/58 439/571 |
| 2014/0357118 A1* | 12/2014 | Takeuchi | A47B 81/00 439/540.1 |

* cited by examiner

*Primary Examiner* — Robert N Wieland (57) ABSTRACT

An optical fiber patch panel rack includes a first shelf. The first shelf further includes a first platform having a rectangular shape orientated horizontally within the rack, wherein the first platform includes a first vertical pivot mechanism configured to enable the first platform to pivot vertically about a first vertical pivot point. The first shelf also includes a first elongated strip including a first horizontal pivot mechanism at a first end of the strip configured to enable the first elongated strip to pivot horizontally about a first horizontal pivot point on the first platform, wherein a second end of the first elongated strip includes a first optical adaptor configured to receive and connect a first optical fiber connector with a second optical fiber connector.

20 Claims, 11 Drawing Sheets

HIGH DENSITY OPTICAL PATCH PANEL RACK

BACKGROUND

Optical patch panel racks are used within the field of optical fiber networks for patching numerous incoming optical fibers with numerous outgoing optical fibers in a space efficient manner. Optical patch panel racks permit the easy organization and management of optical fiber connections at a location, and further facilitate easy testing and monitoring of the performance of the optical network. With the complex optical fiber networks employed by modern telecommunications operators, large, very high density optical patch panel racks are typically used.

DETAILED DESCRIPTION OF THE PREFERRED EMBODIMENTS

The following detailed description refers to the accompanying drawings. The same reference numbers in different drawings may identify the same or similar elements. The following detailed description does not limit the invention as claimed.

Telecommunication operators typically prefer the use of dense optical patch panel racks for maintaining and operating their optical networks due to the space savings associated with the use of such dense optical patch panel racks. In an ideal case, to achieve maximum density and maximum space savings, the front panel of an optical patch panel rack is entirely filled with optical connector patching points. Filling the entirety of the front panel of the optical patch panel rack achieves a high density of optical connections, but can result in poor accessibility for the user, operator or technician trying to add or remove optical fiber lines. With such a high density of optical connections, the user, operator or technician, while adding or removing an optical fiber line at one optical connection in the rack may knock loose an adjacent optical connection. Therefore, with a dense optical patch panel rack design, it can be difficult to access a particular optical connection without touching and disturbing other adjacent optical connections in the rack. Additionally, existing optical patch panel racks include modules, in which the optical patch adaptors are disposed, that require the user to slide the entire module out of the face of the rack to enable the user to access the optical patch adaptors for adding or removing optical fiber lines. The sliding of the modules in and out in the rack requires cable slack to exist with the optical fiber lines contained within the rack that, in turn, leads to issues with the optical fiber lines being pinched when the modules are slid back into the rack. Fiber line slack management, thus, is a challenging issue with existing optical patch panel racks.

In embodiments described herein, an optical patch panel rack includes a design that enables a high density of optical connections while also providing improved accessibility for user, operator or technician access to individual optical connections within the rack. An exemplary optical patch panel rack described herein includes multiple strip layers within a shelf of the rack, where each of the strip layers includes multiple strips, that each mount an optical fiber adapter for patching together two optical fiber lines and is attached to an underlying platform via a pivoting mechanism that permits each strip to pivot in a horizontal plane upon the platform. The platform itself further includes a vertical pivoting mechanism, disposed at a rear of the platform towards the back face of the rack, which enables the entire platform, including all of the strips attached to the platform, to pivot vertically upwards or downwards. By pivoting one or more strips in a given strip layer horizontally, and by pivoting the underlying platform for the strip layer vertically upwards or downwards, access space is created in the front panel of the rack that enables the user, operator or technician to reach in and add or remove optical fiber connectors without disturbing adjacent optical connections. Pivoting of the strip layers and the underlying platform eliminates the need to slide the modules/shelves of the rack in and out of the rack, thereby preventing optical fiber lines being pinched by the modules/shelves within the rack and eliminating the need for fiber line slack management.

Figure 1A:
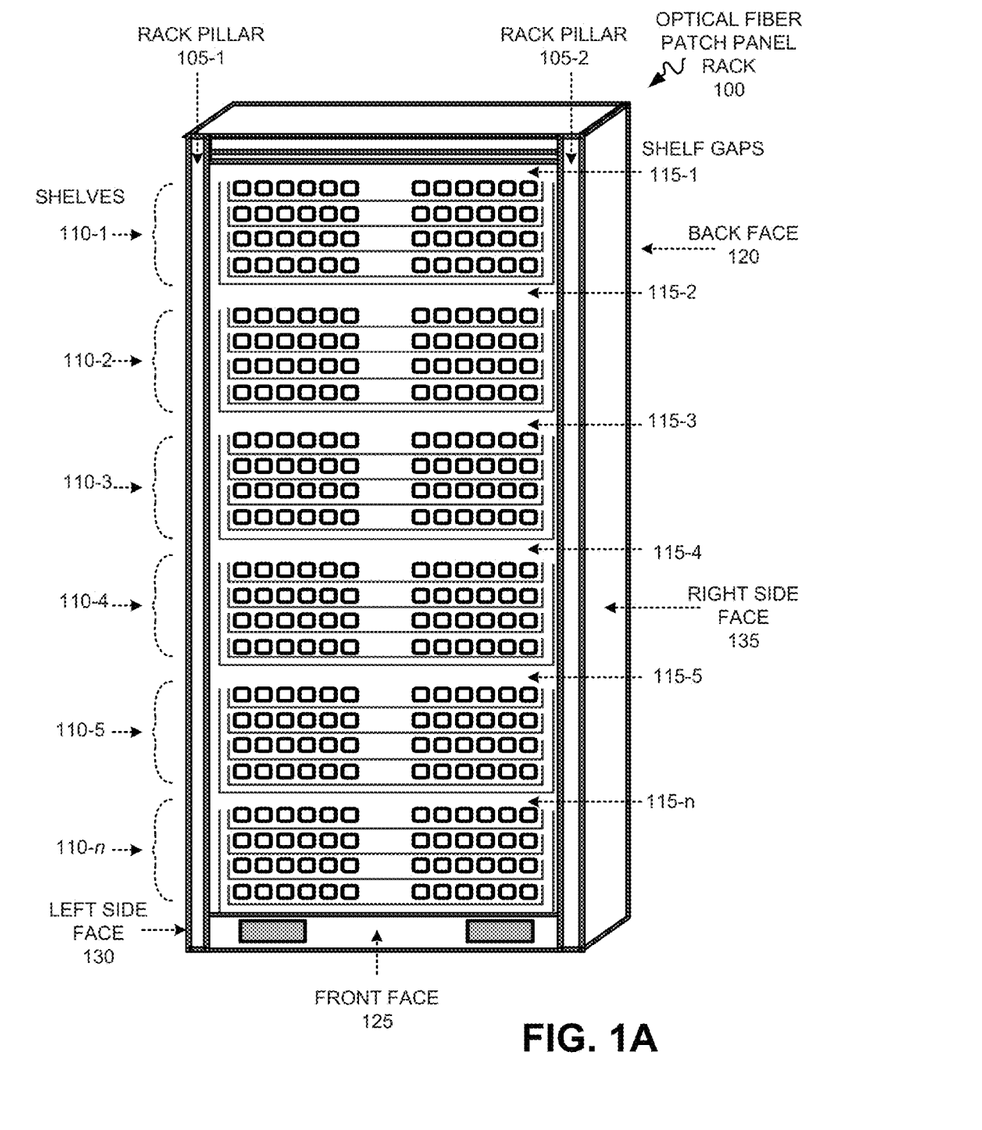
FIGS. 1A and 1B depict an optical fiber patch panel rack according to an exemplary implementation.
Figure 1B:
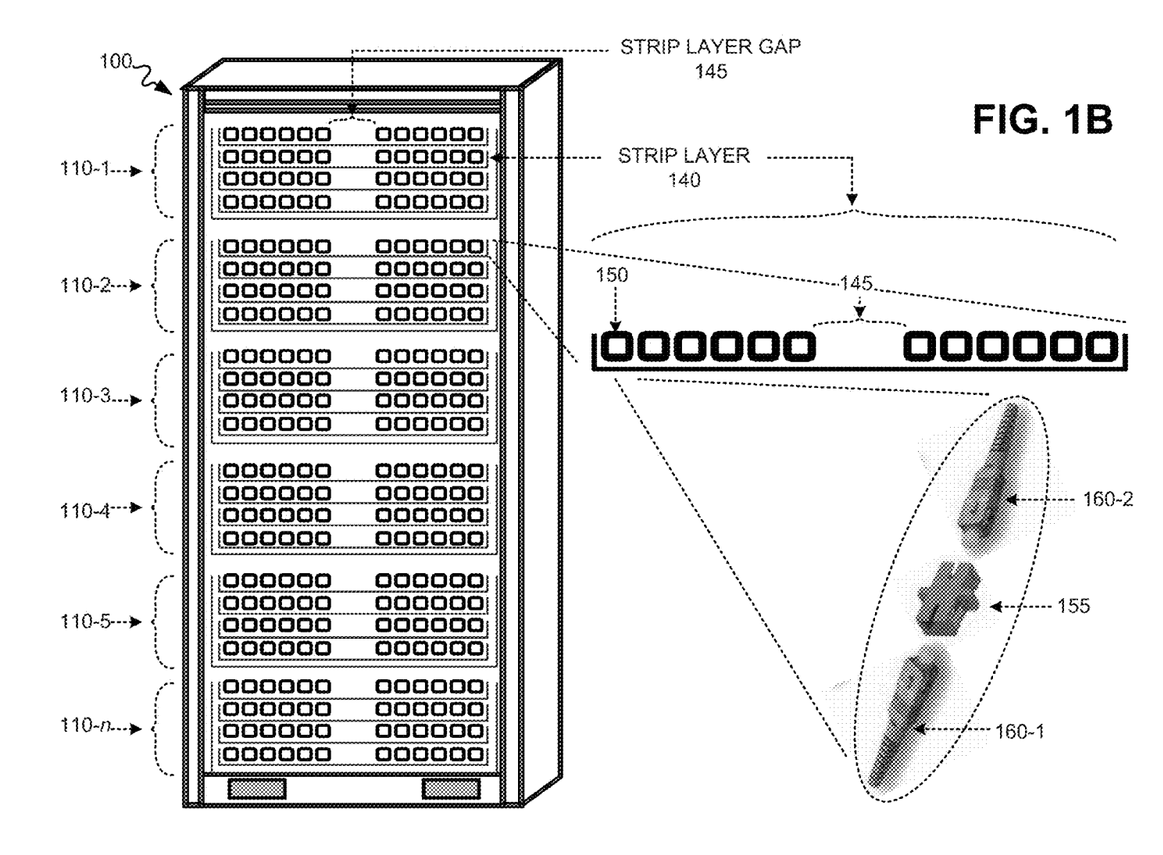

FIGS. 1A and 1B depict an optical fiber patch panel rack 100 according to an exemplary implementation. As shown in FIG. 1A, rack 100 may include an external structure having an elongated cuboid shape. The cuboid shape of the external structure of rack 100 includes a rack pillar 105-1 disposed in a left side face 130, a rack pillar 105-2 disposed in a right side face 135, a back face 120, and a front face 125. Multiple shelves 110-1 through 110-n (where n is a positive integer greater than or equal to one) may be mounted, as will be described in further detail below, within the cuboid external structure of rack 100. In the implementation depicted in FIGS. 1A and 1B, shelves 110-1 through 110-n are arranged and mounted within the external structure of rack 100 such that each of shelves 110-1 through 110-n has a respective shelf gap 115-1 through 115-n that provides a vertical "breathing space" within rack 100 that enables strip layers (described in FIG. 1B below) of the shelves 110 to pivot in a vertical direction relative to one another within rack 100.

FIG. 1B depicts further details of components of shelves 110-1 through 110-n. As shown in FIG. 1B, each shelf 110 includes multiple strip layers 140, where each of the strip layers further includes multiple pivotable strips (described further below) that each mount an optical adaptor that is configured to receive and connect a first optical fiber connector, connected to a first optical fiber line, with a second optical fiber connector, connected to a second optical fiber line. FIG. 1B further depicts an expanded view of a single strip layer 140, where strip layer includes multiple optical adaptors 155 configured to receive and connect a first optical fiber connector 160-1 with a second optical fiber connector 160-2. As also shown in FIG. 1B, each strip layer 140 includes the pivotable strips arranged such that a strip layer gap 145 exists within each strip layer 140. As described further below, strip layer gap 145 permits the pivotable strips in each strip layer 140 to be horizontally pivoted either leftwards or rightwards to enable easier user access to the optical fiber connections.

Figure 2A:
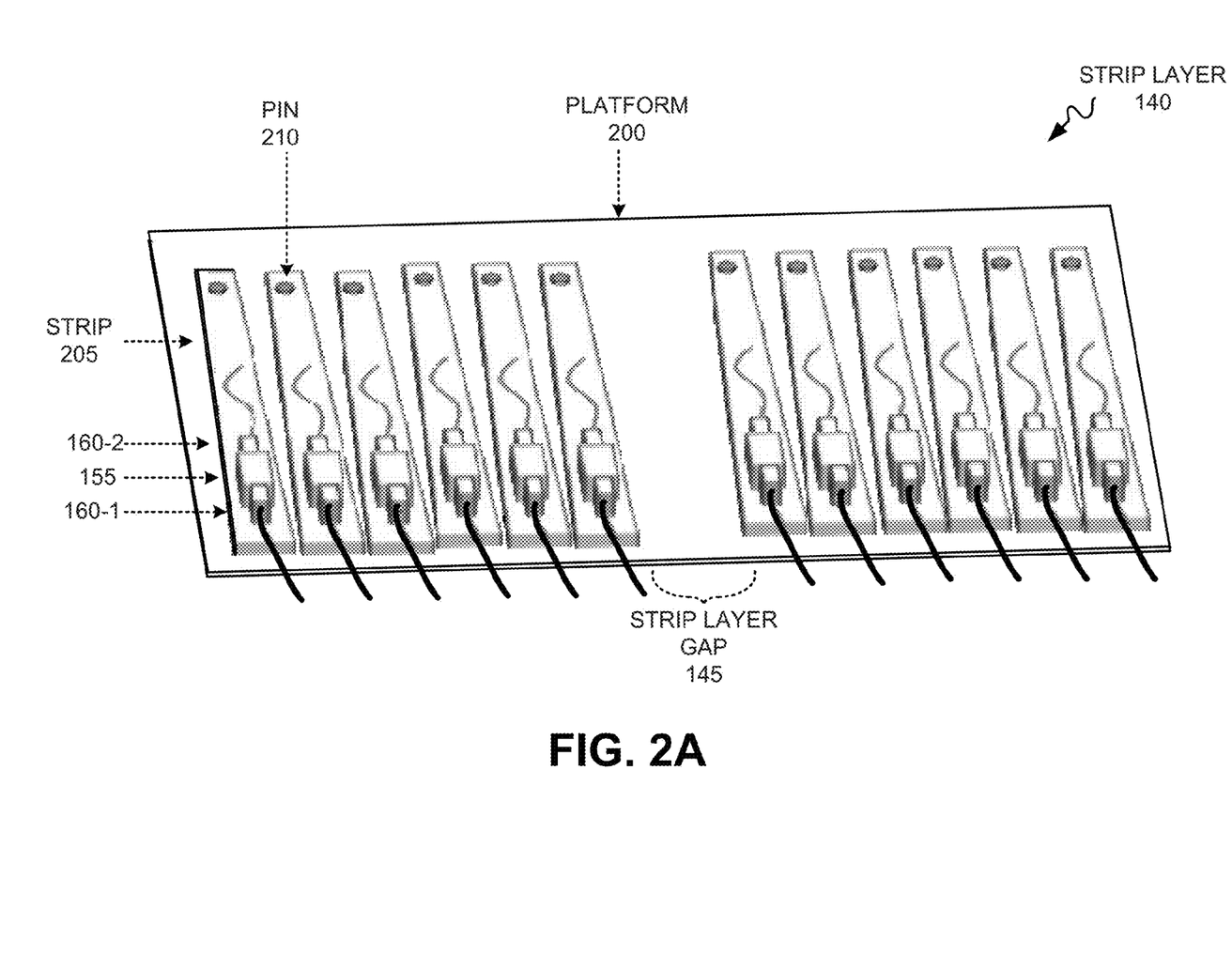
FIGS. 2A-2C depict details of a single strip layer of one of the shelves of the optical fiber patch panel rack of FIGS. 1A and 1B.
Figure 2B:
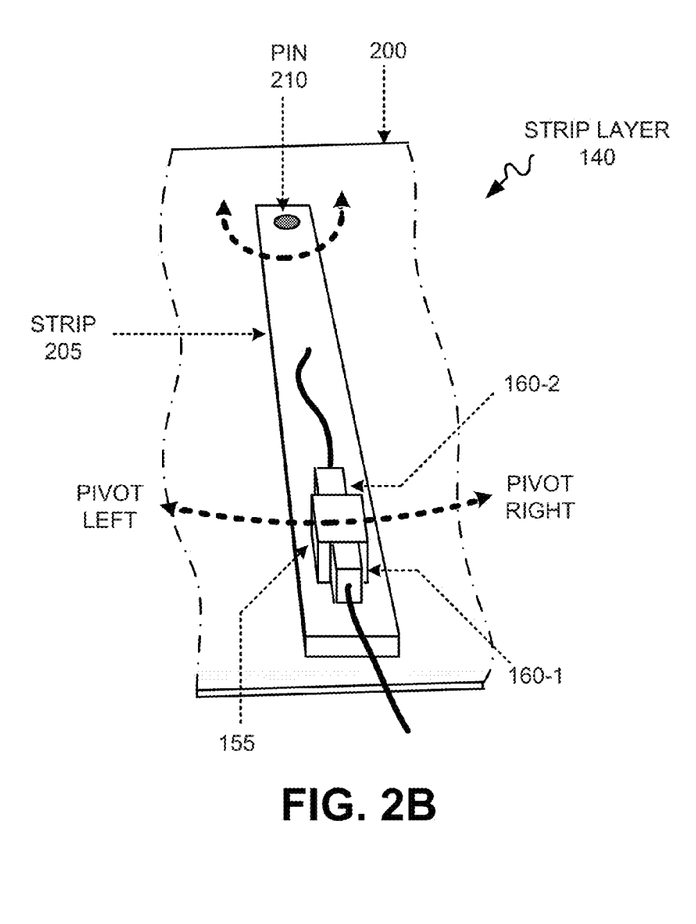
Figure 2C:
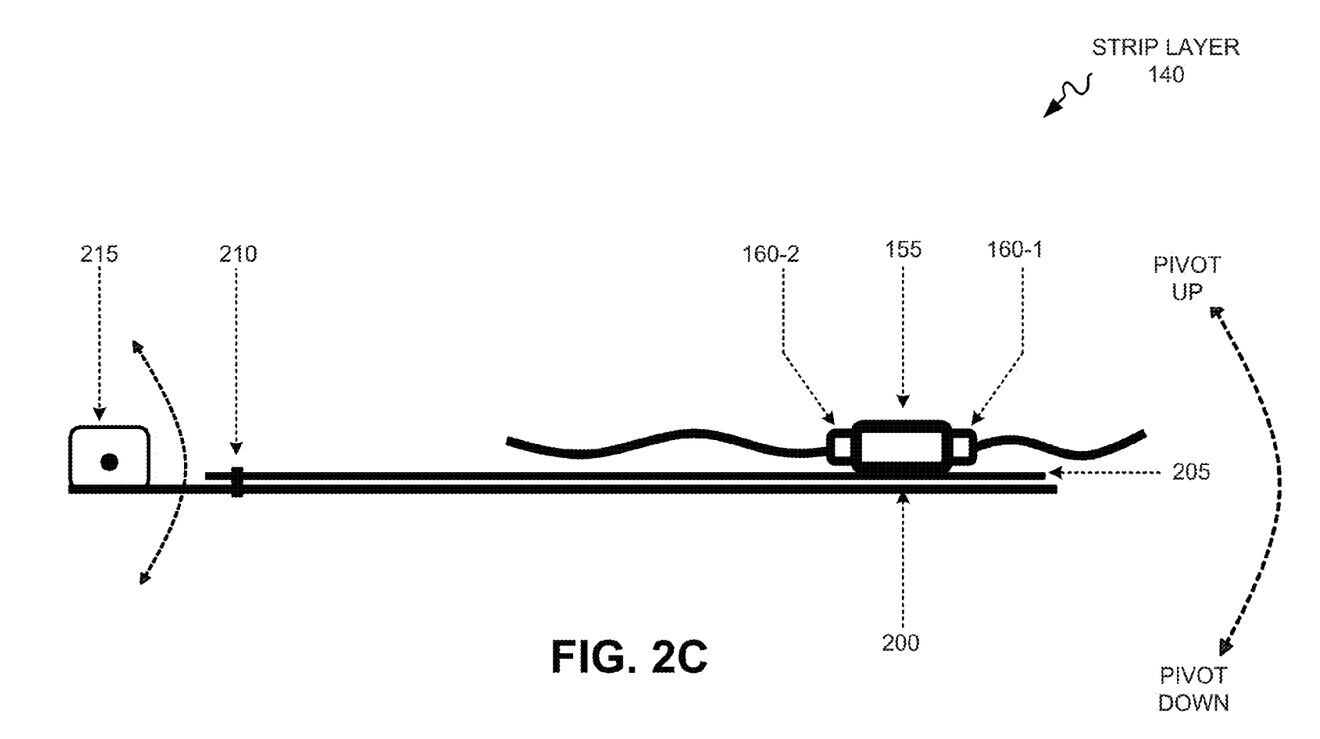

FIGS. 2A-2C depict details of a single strip layer 140 of a shelf 110 of FIG. 1B. As shown in FIG. 2A, multiple strips 205 may be mounted on a platform 200, where platform 200 includes a flat rectangular shape orientated and mounted horizontally within rack 100. Platform 200 may be composed of a durable, hard material such as, for example, metal. Each strip 205 may include a flat, elongated trapezoidal shape, wherein one end of strip 205 is wider than the other end of strip 205. Strip 205 may also be formed from a durable hard material such as, for example, metal or a composite material. The thickness of each strip 205 may be relatively thin (e.g., less than one half of an inch). As shown in FIG. 2A, a narrower end of strip 205 may be attached to platform 200 via a horizontal pivot mechanism 210. In one implementation, the horizontal pivot mechanism 210 for each strip 205 includes a pivot pin 210 that is inserted through a pivot hole in strip 205 and into platform 200 to mount strip 205 to platform 200, but also to enable pin 210 to pivot in a horizontal plane about a pivot point of pivot mechanism 210. As further shown in FIG. 2A, the wider end of strip 205 may mount optical adaptor 155 which receives and connects optical fiber connector 160-1 with optical fiber connector 160-2. FIG. 2A depicts strip layer gap 145 existing between multiple strips 205 on one end of platform 200 and multiple other strips 205 on the other end of platform 200. In one implementation, as shown in FIG. 2A, strip layer gap 145 may be centered upon platform 200 (i.e., midway along platform 200 between left side face 130 and right side face 135 of rack 100). Strip layer gap 145 provides space for strips 205 to pivot in a horizontal plane on platform 200. FIG. 2B depicts further details of an individual strip 205 of a strip layer 140 pivoting about pivot pin 210. As shown, pivot pin 210 enables strip 205 to pivot either left or right about a pivot point such that the wider end of strip 205 traces out an arc in a horizontal plane upon platform 200 (as shown by the dotted arrows in FIG. 2B).

FIG. 2C depicts further details of the vertical pivoting of a strip layer 140. As shown, a vertical pivot mechanism 215 is attached to a side of platform 200 that is opposite to a side of platform 200 at which optical adaptor 155 is mounted upon strip 205. Vertical pivot mechanism 215 may be mounted on platform 200 on a side of platform 200 facing, and closest to, back face 120 of rack 100. Vertical pivot mechanism 215 may include any type of pivoting mechanism that enables platform 200 to pivot about a pivot axis or pivot point located near the side of platform 200 facing, and closest to, back face 120 of rack 100. Vertical pivot mechanism 215 may include, for example, a single pivot "axle" that runs a length of platform 200 along the side of platform 200 facing, and closest to, back face 120 of rack 100, or multiple pivot pins mounted at multiple locations along a length of platform 200 along the side of platform 200 facing, and closest to, back face 120 of rack 100. As shown in FIG. 2C, vertical pivot mechanism 215 enables platform 200, including the strips 205 mounted to platform 200 via a respective pivot pin 210, to be pivoted upwards or downwards about a pivot axis/point defined by vertical pivot mechanism 215. A user, operator or technician may, therefore, adjust a front edge of platform 200 upwards or downwards to provide additional space between, for example, platform 200 and a vertically adjacent platform 200 (not shown in FIG. 2C). Opening up additional vertical space between platform 200 and an adjacent platform 200 provides working space for the user, operator or technician to reach in and connect or disconnect optical fiber connectors 160 to/from a respective optical adaptor 155 of a strip 205.

Figure 3A:
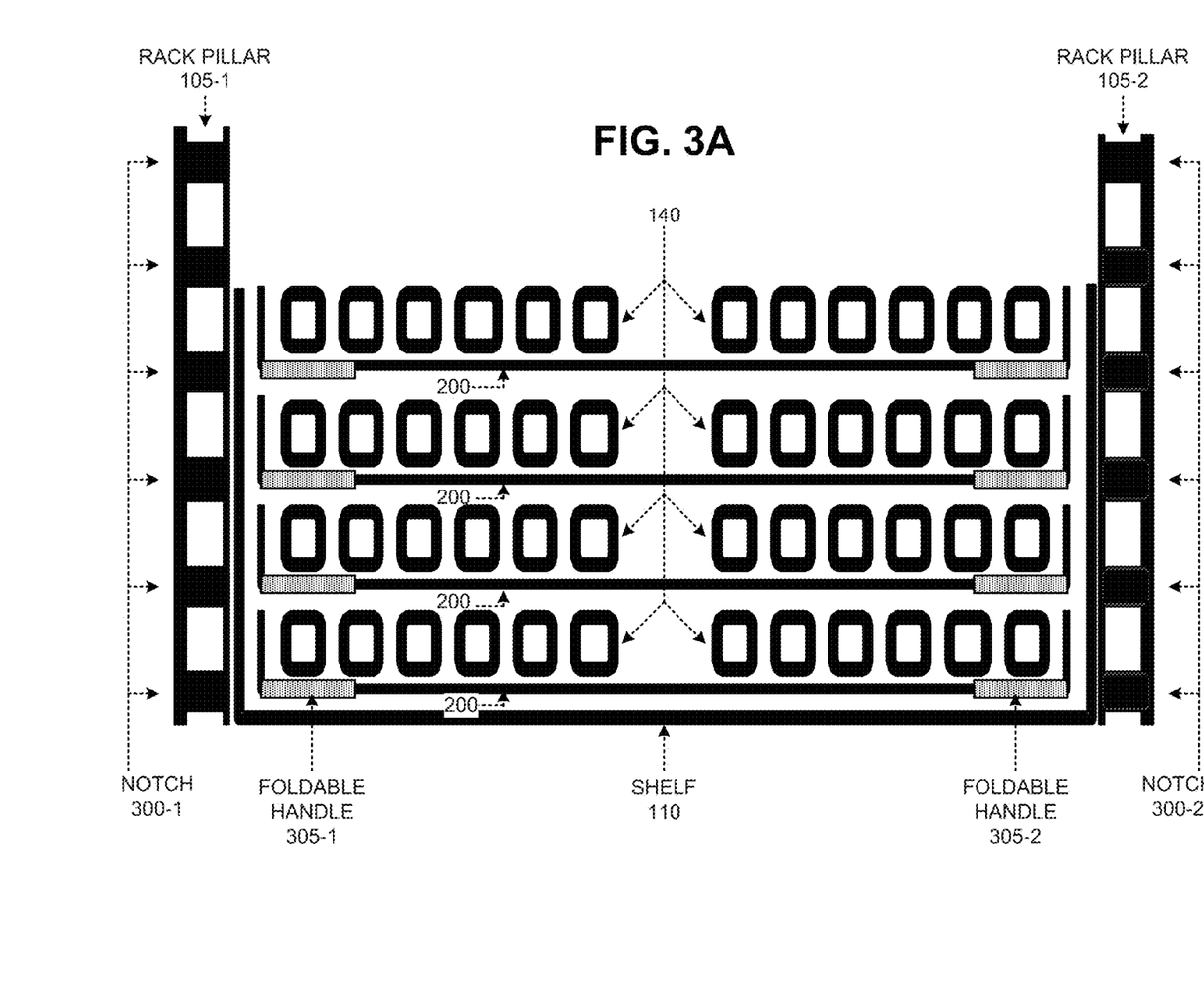
FIGS. 3A and 3B depict the disposition of foldable handles in each strip layer of a shelf of the optical fiber patch panel rack of FIGS. 1A and 1B.
Figure 3B:
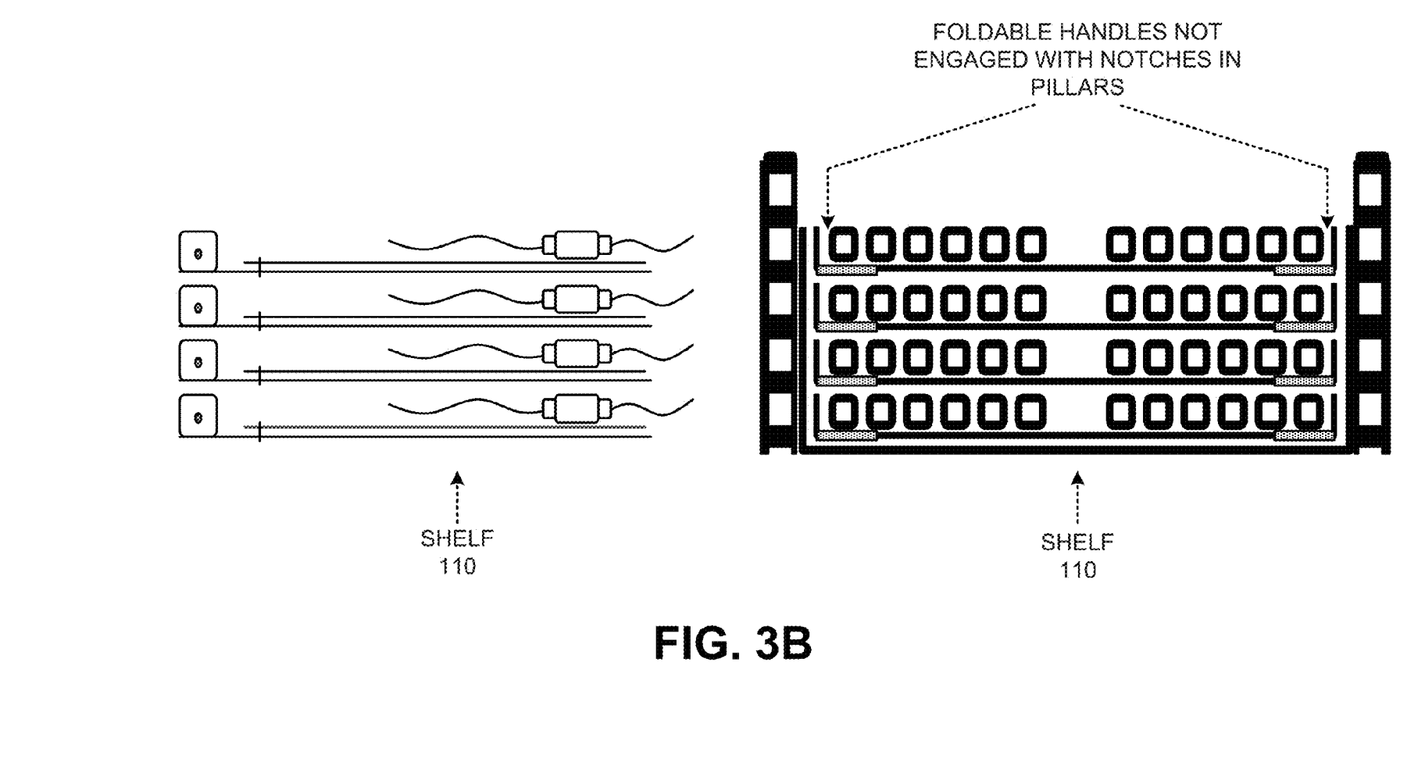

FIGS. 3A and 3B depict the disposition of foldable handles in each strip layer 140 of a shelf 110 of rack 100. As shown, rack pillar 105-1 include an evenly spaced sequence of notch(es) 300-1, and rack pillar 105-2 also includes an evenly spaced sequence of notch(es) 300-2. Each of the notches 300-1 of rack pillar 105-1 has a same vertical position as a corresponding notch 300-2 of rack pillar 105-2 such that each notch 300-1 of rack pillar 105-1 lines up with (i.e., has an identical height of) a corresponding notch 300-2 on rack pillar 105-2.

As shown in FIG. 3A, each strip layer 140 includes a foldable handle 305-1 at one side of strip layer 140, adjacent to rack pillar 105-1, and a foldable handle 305-2 at the other side of strip layer 140, adjacent to rack pillar 105-2, where foldable handles 305-1 and 305-2 are disposed on a front edge of platform 200 of strip layer 140 that corresponds to front face 125 of rack 100. Each notch 300 includes a recessed slot in pillar 105 having dimensions suitable for receiving foldable handle 305 such that foldable handle 305 fits into the recessed slot of notch 300 to hold platform 200 in a fixed position with respect to rack pillar 105. By engaging foldable handles 305-1 and 305-2 with respective notches 300-1 and 300-2, the platform 200 for the strip layer 140 may be held in a fixed position between rack pillars 105-1 and 105-2. When foldable handles 305-1 and 305-2 are not engaged with respective notches 300-1 and 300-2, then the multiple strip layers 140 within shelf 110 may be held in position within rack 100 by the lower structure of shelf 110. Each of strip layers 140 of shelf 110 may have a horizontal "default" position within shelf 110 relative to one another in which each of strip layers 140 is not pivoted relative to the other layers 140 within shelf 110. In one implementation, in the "default" position, each of strip layers 140 may rest upon one another (or upon a structural spacing element that maintains a gap between a strip layer 140 and an underlying strip layer 140), with the lowest strip layer 140 directly abutting (e.g., resting upon) the lower support structure of shelf 110. FIG. 3B depicts a side view and a front view of a shelf 110 in a scenario in which foldable handles 305 have not been engaged with notches 300 of pillars 105 such that the multiple strip layers 140 of shelf 110 rest in a horizontal "default" position (i.e., un-pivoted position) within shelf 110.

Figure 4A:
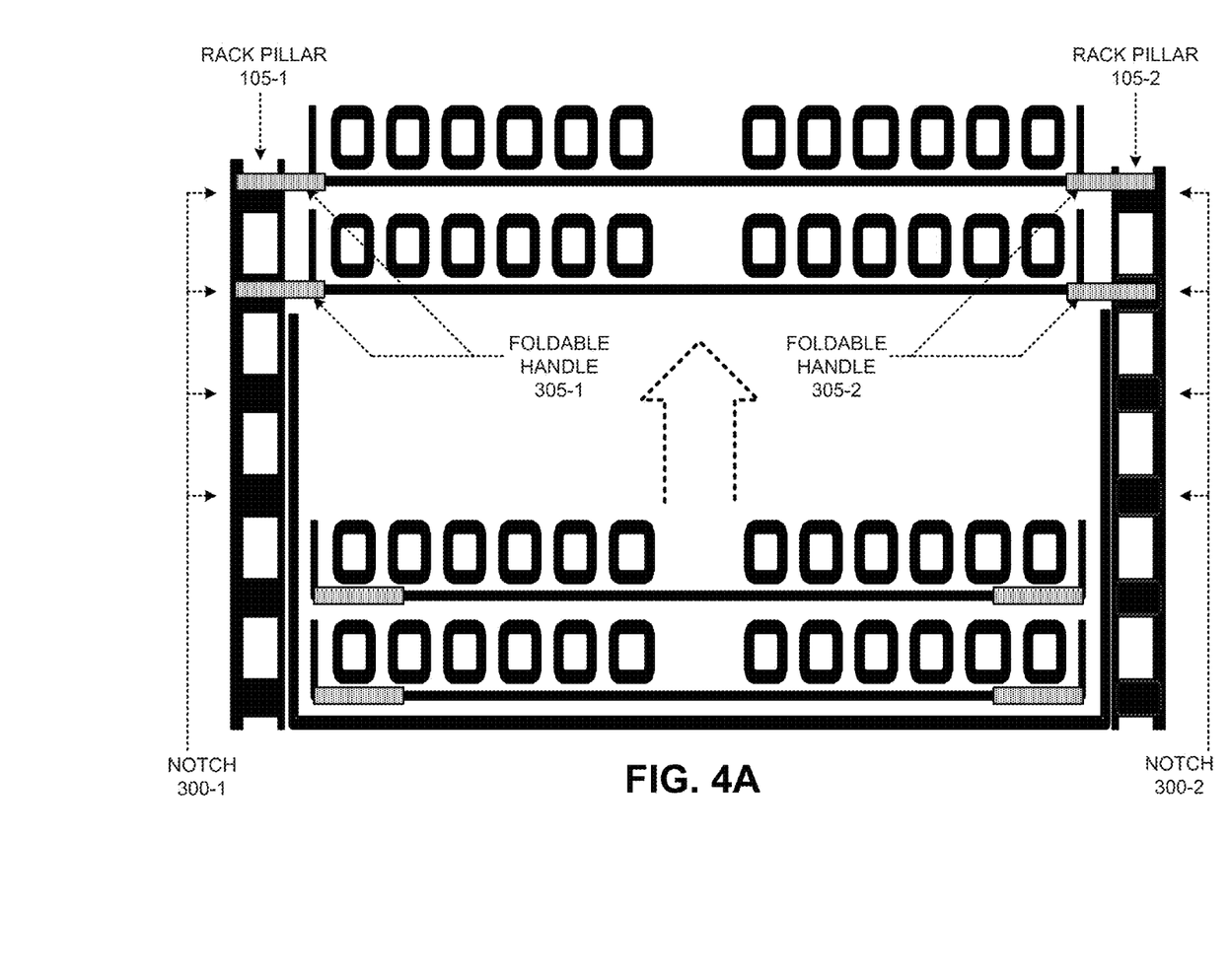
FIGS. 4A and 4B depict the disposition of foldable handles in one or more strip layers of a shelf of the optical fiber patch panel rack of FIGS. 1A and 1B where the one or more strip layers have been pivoted upwards from the positions of the strip layers shown in FIGS. 3A and 3B.
Figure 4B:
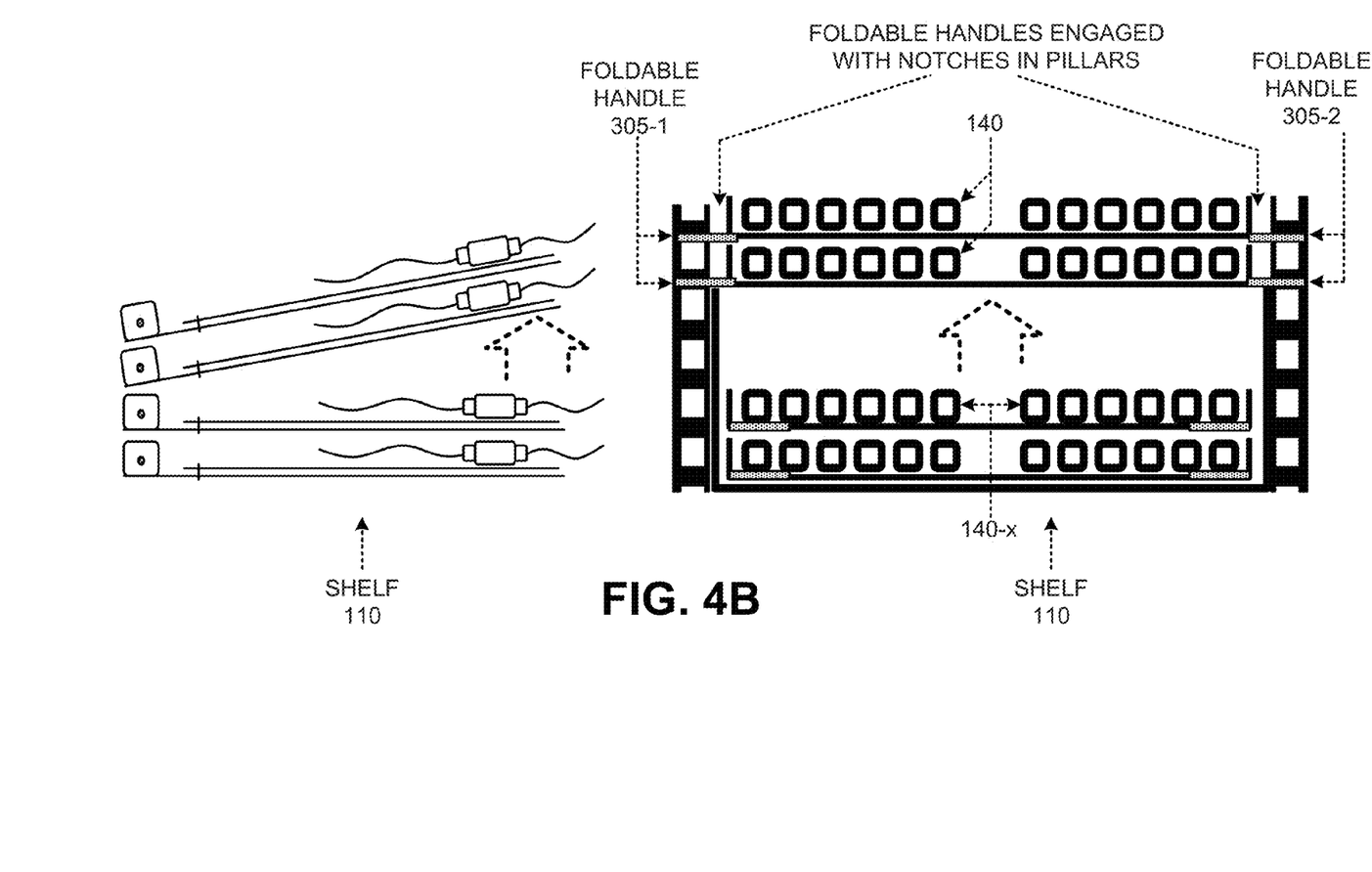

FIGS. 4A and 4B depict the disposition of foldable handles in one or more strip layers 140 of a shelf 110 of rack 100 in a scenario where the one or more strip layers 140 have been pivoted upwards from the positions of the strip layers 140 shown in FIGS. 3A and 3B. As shown in the example of FIG. 4A, two strip layers 140 are pivoted upwards and foldable handles 305-1 and 305-2 for each of the strip layers 140 are moved to engage with respective notches 300 in rack pillars 105-1 and 105-2 to hold the strip layers 140 in an elevated, upwards-pivoted, position within rack 100.

FIG. 4B depicts a side and front view of a shelf 110 in the case in which foldable handles 305 have been engaged with notches 300 of pillars 105 such that the multiple strip layers 140 of shelf 110 are held in an elevated, upwards-pivoted, position within rack 100. As seen in the example of FIG. 4B, the two upper strip layers 140 have been pivoted vertically upwards two notches 300 upon pillars 105-1 and 105-2, and the foldable handles 305-1 and 305-2 have been moved to engaged with the elevated notches 300 to hold the two strip layers 140 in an elevated, pivoted-upwards, position that permits a user, operator or technician to reach and add/remove optical fiber lines to/from the lower strip layer 140

(labeled 140-*x* in FIG. 4B) that has been made accessible by the upwards pivoting of the two upper strip layers 140. Sufficient space exists within rack 100 for the upward pivoting of the strip layers 140, shown in FIG. 4B, due to the existence of a shelf gap 115 between shelves 110 of rack 100. Upon completion of the work by the user, operator or technician, the foldable handles 305-1 and 305-2 may be disengaged from the elevated notches 300 to permit the two elevated strip layers 140 to return to the "default" horizontal position depicted in FIGS. 3A and 3B.

Figure 5:
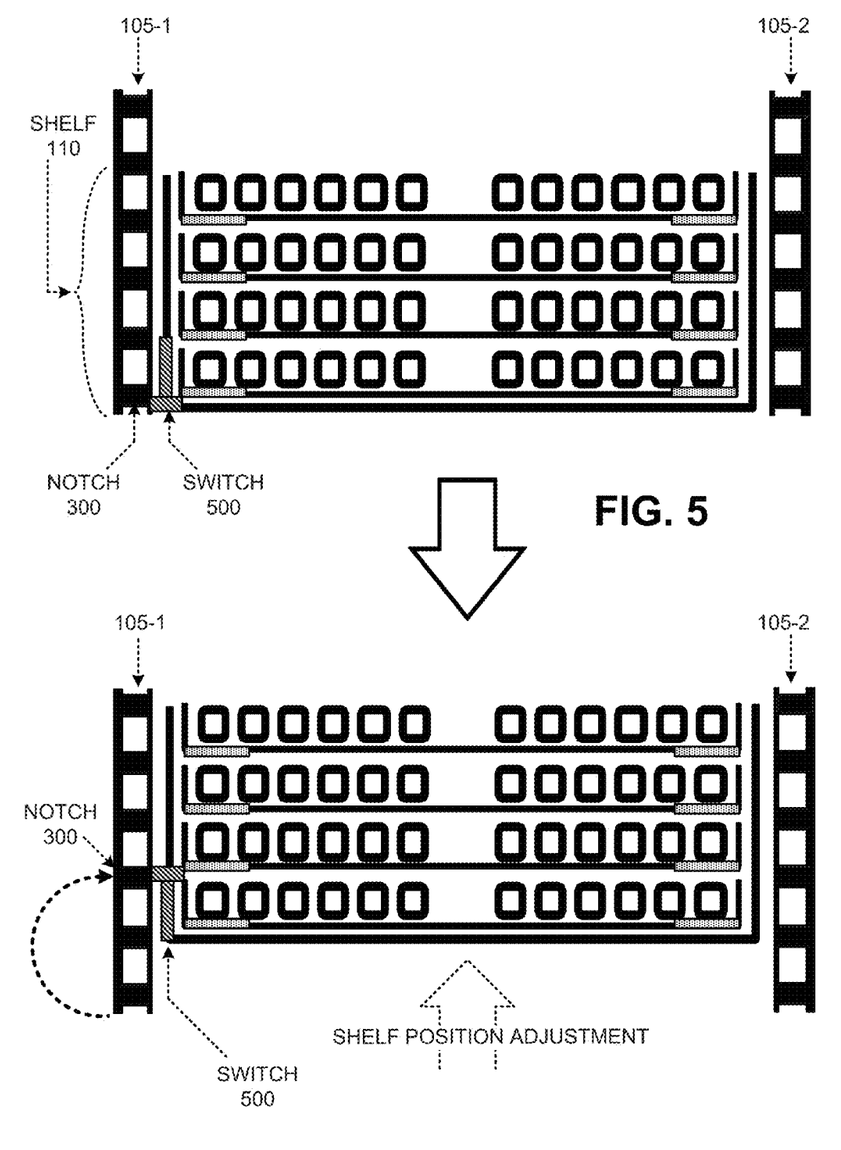
FIGS. 5 and 6 depict another exemplary implementation in which rack switches are used for adjusting entire shelves, including all of each shelf's constituent strip layers, upwards or downwards in a pivoted fashion.
Figure 6:
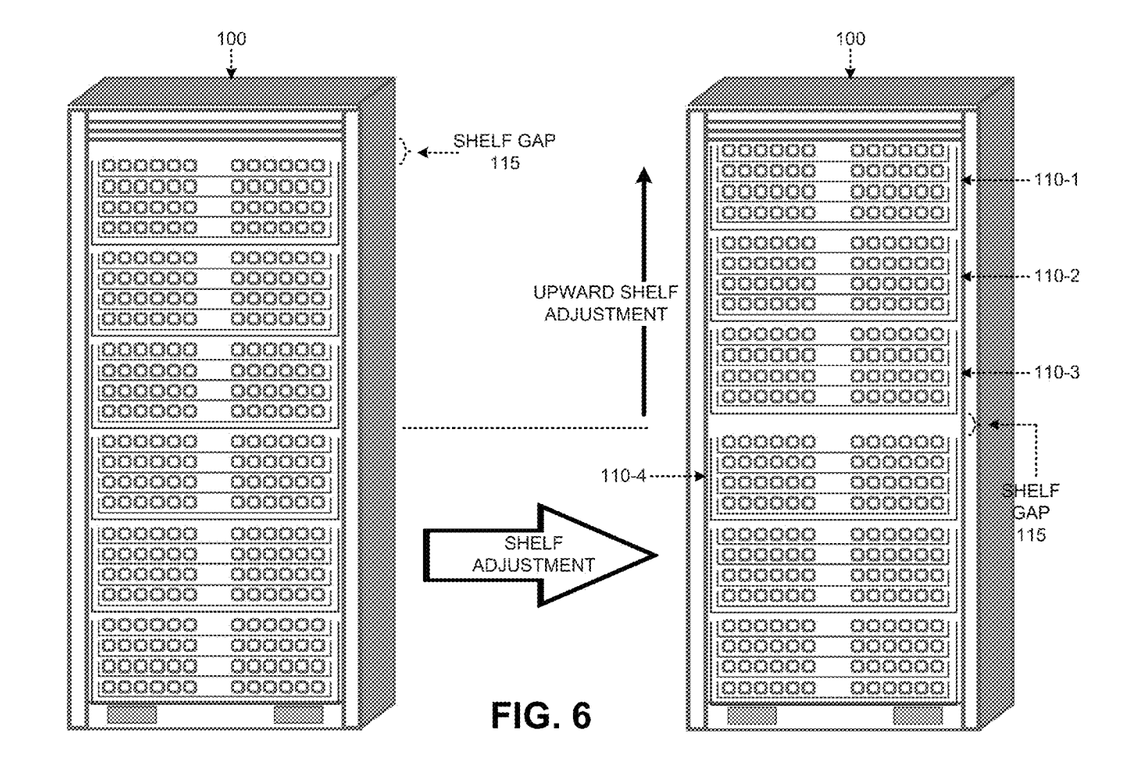

FIGS. 5 and 6 depict another exemplary implementation in which rack switches are used for adjusting entire shelves 110, including all of each shelf's constituent strip layers 140, upwards or downwards in a pivoted fashion. As shown in FIG. 5, each shelf 110 may include a switch 500 (also referred to as a "handle" or "lever") that may be moved to engage with a notch 300 of a pillar 105 to hold the shelf 110, including all the constituent strip layers 140, in a pivoted-upwards or downwards position. In a case where shelf 110 is pivoted upwards, switch 500 may be moved to engage with a notch in pillar 105 that is, for example, two notches higher than the previous notch, such as shown in the example of FIG. 5 (and as illustrated by the dotted arrow in FIG. 5 depicting the movement of switch 500). In a different scenario (not shown in FIG. 5), shelf 110 may be pivoted downwards and switch 500 may be moved to be engaged with a notch in pillar 105 that is, for example, two notches lower than the previous notch. Shelf position adjustment, as depicted in FIG. 5, frees up vertical space above or below a given shelf 110 to permit pivoting movement of other adjacent shelves, or strip layers 140, and/or to enable user access to optical connections within rack 100. Switch 500 may, in one implementation, be used to move a shelf 110 in a vertical direction from approximately one inch to approximately six inches, depending on the spacing of notches upon pillar 105.

FIG. 6 depicts an example of the upwards pivoted adjustment of shelves 110-1, 110-2 and 110-3 into the shelf gap 115 depicted in rack 100 on the left such that movement of shelves 110-1, 110-2 and 110-3 opens a shelf gap 115 beneath shelf 110-3, as depicted in rack 100 on the right of FIG. 6. Shelf gap 115, therefore, provides vertical space within rack 100 such that one or more shelves 110 may be pivoted upwards or downwards. Opening shelf gap 115 beneath shelf 110-3 enables the user, operator or technician to more easily access the optical adaptors and connectors of the strip layers of shelf 110-4. Upon completion of the work, the user, operator or technician may move switch 500 back to its original position (shown at the top of FIG. 5) such that the shelves are returned to their original positions within rack 100.

The foregoing description of implementations provides illustration and description, but is not intended to be exhaustive or to limit the invention to the precise form disclosed. Modifications and variations are possible in light of the above teachings or may be acquired from practice of the invention. Two exemplary implementations have been described with respect to FIG. 1A and FIG. 6. In the first exemplary implementation of FIG. 1A, each shelf 110 of rack 100 has a corresponding shelf gap 115, and individual strip layers 140 within the shelves 100 may be pivoted upwards or downwards into the shelf gap 115 and held in position using foldable handles 305. In the second exemplary implementation of FIG. 6, a single shelf gap exists within a front face 125 of rack 100, and shelves 110 may be adjusted upwards or downwards into the single shelf gap and held in position using a shelf switch. In further exemplary implementations, the foldable handles of FIG. 1A and the shelf switch of FIG. 6 may be used in combination to enable both the upwards/downwards adjustment of entire shelves 110, and the additional upwards/downwards adjustment of individual strip layers 140 within those shelves 110. In still other implementations, other types of mechanical and/or electrical mechanisms, different than pivot pin 210 shown in FIGS. 2A and 2B may be used to pivot and move strips 205 in the horizontal plane upon platform 200, and/or to move platforms 200 in a vertical direction (as shown in FIG. 2C).

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An optical fiber patch panel rack, comprising:
    a first shelf comprising:
        a first platform having a rectangular shape orientated horizontally within the rack, wherein the first platform includes a first vertical pivot mechanism configured to pivot the first platform vertically about a first vertical pivot point, and
        a first elongated strip including a first horizontal pivot mechanism, attached to the first platform at a first end of the strip, and configured to enable the first elongated strip to pivot horizontally about a first horizontal pivot point on the first platform, wherein a second end of the first elongated strip includes a first optical adaptor configured to receive and connect a first optical fiber connector with a second optical fiber connector,
        wherein the first vertical pivot mechanism is further configured to pivot the first elongated strip and the first optical adapter, in conjointment with the first platform, vertically about the first vertical pivot point.

2. The optical fiber patch panel rack of claim 1, wherein the rack further comprises a first pillar disposed adjacent to a first side of the first shelf and a second pillar disposed adjacent to a second side of the first shelf and wherein the first platform further comprises:
    a first foldable handle connected to a first side of the first platform that is adjacent to the first pillar; and
    a second foldable handle connected to a second side of the first platform that is adjacent to the second pillar,
        wherein the first foldable handle moves to engage with a first notch in the first pillar and wherein the second foldable handle moves to engage with a second notch in the second pillar such that the first foldable handle and the second foldable handle hold the first platform in a vertically pivoted position within the rack.

3. The optical fiber patch panel rack of claim 1, wherein the first elongated strip comprises a material formed in a trapezoidal shape, wherein the second end of the strip, comprising a second end of the trapezoidal shape, is wider than the first end of the strip that comprises a first end of the trapezoidal shape.

4. The optical fiber patch panel rack of claim 1, wherein the first shelf further comprises:
a second elongated strip, disposed on the first platform adjacent the first elongated strip, that includes a second horizontal pivot mechanism, attached to the first platform at a first end of the second elongated strip, and configured to enable the second elongated strip to pivot horizontally about a second horizontal pivot point on the first platform, wherein a second end of the second elongated strip includes a second optical adaptor configured to receive and connect a third optical fiber connector with a fourth optical fiber connector.

5. The optical fiber patch panel rack of claim 4, wherein the first horizontal pivot mechanism of the first elongated strip and the second horizontal pivot mechanism of the second elongated strip enable the first and second elongated strips to pivot horizontally in conjunction with one another.

6. The optical fiber patch panel rack of claim 4, wherein the first shelf further comprises:
a third elongated strip, disposed on the first platform adjacent to, and having a horizontal gap with, the second elongated strip, that includes a third horizontal pivot mechanism, attached to the first platform at a first end of the third elongated strip, and configured to enable the third elongated strip to pivot horizontally about a third pivot point on the first platform, wherein a second end of the third elongated strip includes a third optical adaptor configured to receive and connect a fifth optical fiber connector with a sixth optical fiber connector.

7. The optical fiber patch panel rack of claim 1, wherein the first shelf further comprises:
a second platform disposed vertically adjacent to the first platform within the rack and having a rectangular shape that is orientated horizontally within the rack, wherein the second platform includes a second vertical pivot mechanism configured to enable the second platform to pivot vertically about a second vertical pivot point, and
a second elongated strip including a second horizontal pivot mechanism at a first end of the second elongated strip configured to enable the second elongated strip to pivot horizontally about a second horizontal pivot point on the second platform, wherein a second end of the second elongated strip includes a second optical adaptor configured to receive and connect a third optical connector with a fourth optical connector.

8. The optical fiber patch panel rack of claim 7, wherein the second vertical pivot mechanism of the second platform and the first vertical pivot mechanism of the first platform enable the second platform and the first platform to pivot vertically together with one another.

9. A structure, comprising:
a first platform having a horizontally orientated rectangular shape, wherein the first platform includes a first vertical pivot mechanism configured to enable the first platform to pivot vertically about a first vertical pivot point, and
a first elongated strip including a first horizontal pivot mechanism at a first end of the strip configured to enable the first elongated strip to pivot horizontally about a first horizontal pivot point on the first platform, wherein a second end of the first elongated strip includes a first optical adaptor configured to receive and connect a first optical fiber connector with a second optical fiber connector,
wherein the first vertical pivot mechanism is further configured to pivot the first elongated strip and the first optical adapter, in conjointment with the first platform, vertically about the first vertical pivot point.

10. The structure of claim 9, wherein the first elongated strip comprises a material formed in a trapezoidal shape, wherein the second end of the strip, comprising a second end of the trapezoidal shape, is wider than the first end of the strip that comprises a first end of the trapezoidal shape.

11. The structure of claim 9, wherein the first platform is a component of an optical fiber patch panel rack.

12. The structure of claim 9, wherein the first platform further comprises:
a second elongated strip, disposed on the first platform adjacent the first elongated strip, that includes a second horizontal pivot mechanism at a first end of the second elongated strip configured to enable the second elongated strip to pivot horizontally about a second horizontal pivot point on the first platform, wherein a second end of the second elongated strip includes a second optical adaptor configured to receive and connect a third optical connector with a fourth optical connector.

13. The structure of claim 12, wherein the first platform further comprises:
a third elongated strip, disposed on the first platform adjacent to, and having a horizontal gap with, the second elongated strip, that includes a third horizontal pivot mechanism at a first end of the third elongated strip configured to enable the third elongated strip to pivot horizontally about a third pivot point on the first platform, wherein a second end of the third elongated strip includes a third optical adaptor configured to receive and connect a fifth optical connector with a sixth optical connector.

14. The structure of claim 9, further comprising:
a second platform disposed vertically adjacent to the first platform and having a horizontally orientated rectangular shape, wherein the second platform includes a second vertical pivot mechanism configured to enable the second platform to pivot vertically about a second vertical pivot point, and
a second elongated strip including a second horizontal pivot mechanism at a first end of the second elongated strip configured to enable the second elongated strip to pivot horizontally about a second horizontal pivot point on the second platform, wherein a second end of the second elongated strip includes a second optical adaptor configured to receive and connect a third optical connector with a fourth optical connector.

15. The structure of claim 14, wherein the second vertical pivot mechanism of the second platform and the first vertical pivot mechanism of the first platform enable the second platform and the first platform to pivot vertically together with one another.

16. An optical patch panel rack comprising:
a structure comprising a first pillar, a second pillar, a front face, and a back face; and
a plurality of shelves arranged vertically adjacent to one another within the structure between the first pillar and the second pillar, wherein each of the shelves is configured to pivot upwards or downwards within the rack about a respective pivot point disposed towards the back face of the structure, wherein each of the plurality of shelves further comprises a respective plurality of optical adapters configured to receive and connect optical fiber connectors, and wherein each of the shelves is further configured to pivot the respective plurality of optical adapters, in conjointment with each of the shelves, upwards or downwards within the rack about the respective pivot point.

17. The optical patch panel rack of claim 16, wherein the plurality of shelves comprises a first shelf and further comprising:

a switch or handle configured to, subsequent to the first shelf being pivoted upwards or downwards, lock the first shelf into a pivoted position via the first pillar or the second pillar.

18. The optical patch panel rack of claim 16, wherein the rack includes a gap between a first and a second shelf of the plurality of shelves and wherein the gap permits the first shelf to be pivoted upwards or downwards relative to the second shelf.

19. The optical patch panel rack of claim 16, wherein each of the plurality of shelves further comprises:

a first platform having a rectangular shape orientated horizontally within the rack, wherein the first platform includes a first vertical pivot mechanism configured to enable the platform to pivot vertically about a first vertical pivot point that comprises the respective pivot point, and a first elongated strip including a first horizontal pivot mechanism, attached to the first platform at a first end of the strip, and configured to enable the first elongated strip to pivot horizontally about a first horizontal pivot point on the first platform, wherein a second end of the first elongated strip includes a first optical adaptor of the respective plurality of optical adapters configured to receive and connect a first optical fiber connector with a second optical fiber connector, wherein the first vertical pivot mechanism is further configured to pivot the first elongated strip and the first optical adapter, in conjointment with the first platform, vertically about the first vertical pivot point.

20. The optical patch panel rack of claim 19, wherein the first platform further comprises:

a first foldable handle connected to a first side of the first platform that is adjacent to the first pillar; and a second foldable handle connected to a second side of the first platform that is adjacent to the second pillar, wherein the first foldable handle moves to engage with a first notch in the first pillar and wherein the second foldable handle moves to engage with a second notch in the second pillar such that the first foldable handle and the second foldable handle hold the first platform in a vertically pivoted position within the rack.

* * * * *